US012684604B2

(12) United States Patent
   Jiang

(10) Patent No.: US 12,684,604 B2
(45) Date of Patent: Jul. 14, 2026

(54) RESOURCE SELECTION METHOD AND TERMINAL

(71) Applicant: VIVO MOBILE COMMUNICATION CO., LTD., Guangdong (CN)

(72) Inventor: Wei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 956 days.

(21) Appl. No.: 17/742,006

(22) Filed: May 11, 2022

(65) Prior Publication Data

US 2022/0272709 A1      Aug. 25, 2022

Related U.S. Application Data

(63) Continuation of application No. PCT/CN2020/128005, filed on Nov. 11, 2020.

(30) Foreign Application Priority Data

Nov. 18, 2019    (CN) .......................... 201911128400.X

(51) Int. Cl.
| | |
|---|---|
| *H04W 72/53* | (2023.01) |
| *H04L 5/00* | (2006.01) |
| *H04W 72/54* | (2023.01) |
| *H04W 72/56* | (2023.01) |
| *H04W 74/0808* | (2024.01) |

(52) U.S. Cl.
CPC ........... *H04W 72/53* (2023.01); *H04L 5/0055* (2013.01); *H04W 72/54* (2023.01); *H04W 72/56* (2023.01); *H04W 74/0825* (2013.01)

(58) Field of Classification Search
CPC .... H04L 5/0055; H04L 1/1864; H04W 72/54; H04W 72/56; H04W 74/0825; H04W 72/02; H04W 72/0446; H04W 72/25; H04W 72/542; H04W 72/543; H04W 72/563; Y02D 30/70
See application file for complete search history.

(56) References Cited

U.S. PATENT DOCUMENTS

| | | | | |
|---|---|---|---|---|
| 11,924,808 | B2 * | 3/2024 | Chervyakov | ......... H04W 72/23 |
| 2017/0041902 | A1 | 2/2017 | Sheng | |
| 2018/0227882 | A1 | 8/2018 | Freda et al. | |

(Continued)

FOREIGN PATENT DOCUMENTS

| | | |
|---|---|---|
| CN | 108633065 A | 10/2018 |
| CN | 109644433 A | 4/2019 |

(Continued)

OTHER PUBLICATIONS

First Office Action for Chinese Application No. 201911128400.X, dated Jan. 18, 2022, 7 Pages.

(Continued)

*Primary Examiner* — Sujoy K Kundu

(74) *Attorney, Agent, or Firm* — BROOKS KUSHMAN P.C.

(57) ABSTRACT

A resource selection method and a terminal. The resource selection method includes: triggering a resource selection re-evaluation based on a trigger condition, and performing the resource selection re-evaluation to obtain a re-evaluation result; and performing a resource reselection based on the re-evaluation result.

12 Claims, 5 Drawing Sheets

Trigger a resource selection re-evaluation based on a trigger condition, and perform the resource selection re-evaluation to obtain a re-evaluation result

101

Perform a resource reselection based on the re-evaluation result

102

(56) References Cited

U.S. PATENT DOCUMENTS

| | | | |
|---|---|---|---|
| 2019/0182840 A1 | 6/2019 | Feng et al. | |
| 2020/0169984 A1 | 5/2020 | Lee et al. | |
| 2022/0201528 A1* | 6/2022 | Shin | H04W 24/10 |
| 2022/0377621 A1* | 11/2022 | Lee | H04L 1/08 |
| 2022/0399963 A1* | 12/2022 | Lee | H04W 28/26 |
| 2022/0400477 A1* | 12/2022 | Lee | H04W 72/20 |
| 2022/0400484 A1* | 12/2022 | Lee | H04W 72/02 |

FOREIGN PATENT DOCUMENTS

| | | | | |
|---|---|---|---|---|
| CN | 109792721 A | 5/2019 | | |
| CN | 110248412 A | 9/2019 | | |
| EP | 3499747 A1 * | 6/2019 | | H04B 7/2612 |
| WO | 2015054888 A1 | 4/2015 | | |
| WO | 2018030834 A1 | 2/2018 | | |
| WO | 2018145067 A1 | 8/2018 | | |
| WO | WO-2018174661 A1 * | 9/2018 | | H04L 5/0044 |
| WO | 2019064465 A1 | 4/2019 | | |
| WO | 2019148485 A1 | 8/2019 | | |

OTHER PUBLICATIONS

Second Office Action for Chinese Application No. 201911128400. X, dated Jul. 6, 2022, 9 Pages.
Third Office Action for Chinese Application No. 201911128400.X, dated Oct. 27, 2022, 12 Pages.
First Office Action for Indian Application No. 202227026542, dated Sep. 16, 2022, 6 Pages.
International Search Report and Written Opinion for Application No. PCT/CN2020/128005, dated Jan. 27, 2021, 7 Pages.
Samsung, "Triggering Conditions for Resource Reselection," 3GPP TSG RAN WG1 #85, Agenda item 6.2.2.2.3, May 23-27, 2016, R1-164760, Nanjing, China, 4 Pages.
Sony, "Discussion on NR V2X mode 2 Resource Allocation," 3GPP TSG RAN WG1 #96bis, Agenda item 7.2.4.2.2, Apr. 8-12, 2019, R1-1904256, Xi'an, China, 5 Pages.
Intel Corporation, "Design of Resource Allocation Mode-2 for NR V2X Sidelink Communication," 3GPP TSG RAN WG1 #99, Agenda item 7.2.4.2.2, Nov. 18-22, 2019, R1-1912205, Reno, Nevada, USA, 32 Pages.
Samsung, "On Resource Allocation for NR V2X Mode 2," 3GPP TSG RAN WG1 #99, Agenda item 7.2.4.2.2, Nov. 18-22, 2019, R1-1912460, Reno, Nevada, USA, 11 Pages.
Oppo, "Discussions on Resource Reservation, Sensing and Selection in Mode 2," 3GPP TSG RAN WG1 #99, Agenda item 7.2.4.2.2, Nov. 18-22, 2019, R1-1912794, Reno, Nevada, USA, 16 Pages.
First Office Action for Japanese Application No. 2022-523316, dated May 9, 2023, 4 Pages.
CATT "Discussion on resource allocation mechanism for sidelink Mode 2 in NR V2X" 3GPP TSG RAN WG1 #99, Reno, USA, Nov. 2019, R1-1912155, 13 Pages.
NEC "Mode 2 resource allocation mechanism for NR sidelink" 3GPP TSG RAN WG1 #99, Reno, USA, Nov. 2019, R1-1912617, 7 Pages.
CAICT "Considerations on the resource allocation for NR sidelink Mode2" 3GPP TSG RAN WG1 Meeting #99, Reno, US, Nov. 2019, R1-1913029, 5 Pages.
Vivo "Remaining issues on mode 2 resource allocation mechanism" 3GPP TSG RAN WG1 #100, e-Meeting, Mar. 2020, R1-2000317, 7 Pages.
Extended European Search Report Application No. 20888837.0-1215, dated Dec. 5, 2022, 8 pages.
First Office Action for Korean Application No. 10-2022-7018243, dated Oct. 15, 2024, 8 Pages.
Intel Corporation "Summary#4 for AI 7.2.4.2.2 Mode-2 Resource Allocation" 3GPP TSG RAN WG1 Meeting #98bis, Chongqing, China, Oct. 2019, R1-1911683, 40 Pages.

* cited by examiner

RESOURCE SELECTION METHOD AND TERMINAL

CROSS-REFERENCE TO RELATED APPLICATIONS

This application is a continuation of PCT Application No. PCT/CN2020/128005 filed on Nov. 11, 2020, which claims priority to Chinese Patent Application No. 201911128400.X filed on Nov. 18, 2019, which are incorporated herein by reference in their entireties.

TECHNICAL FIELD

This disclosure relates to the field of communications technologies, and in particular, to a resource selection method and a terminal.

BACKGROUND

In a new radio (NR) internet of vehicles in the related art, two resource allocation modes can be provided based on different resource allocation subjects, including mode 1 and mode 2. Mode 1 refers to a mode in which a network device such as a base station gNB performs resource allocation, and mode 2 refers to a mode in which a terminal such as user equipment (UE) autonomously selects resources. However, in the resource allocation mode of mode 2 in which UE autonomously selects resources, after one UE selects a resource, if corresponding resource reservation signaling is sent late, other UE may not be able to detect a resource reservation of that UE and also select the same resource, causing resource collision.

SUMMARY

According to a first aspect, an embodiment of this disclosure provides a resource selection method, applied to a terminal and including:

triggering a resource selection re-evaluation based on a trigger condition, and performing the resource selection re-evaluation to obtain a re-evaluation result; and performing a resource reselection based on the re-evaluation result.

According to a second aspect, an embodiment of this disclosure provides a terminal, including:

an evaluation module, configured to trigger a resource selection re-evaluation based on a trigger condition, and perform the resource selection re-evaluation to obtain a re-evaluation result; and a selection module, configured to perform a resource reselection based on the re-evaluation result.

According to a third aspect, an embodiment of this disclosure provides a terminal, including a memory, a processor, and a computer program stored in the memory and capable of running on the processor, where when the computer program is executed by the processor, the steps of the foregoing resource selection method are implemented.

According to a fourth aspect, an embodiment of this disclosure provides a computer-readable storage medium, storing a computer program, where when the computer program is executed by a processor, the steps of the foregoing resource selection method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings without creative efforts.

DETAILED DESCRIPTION

Figure 1:
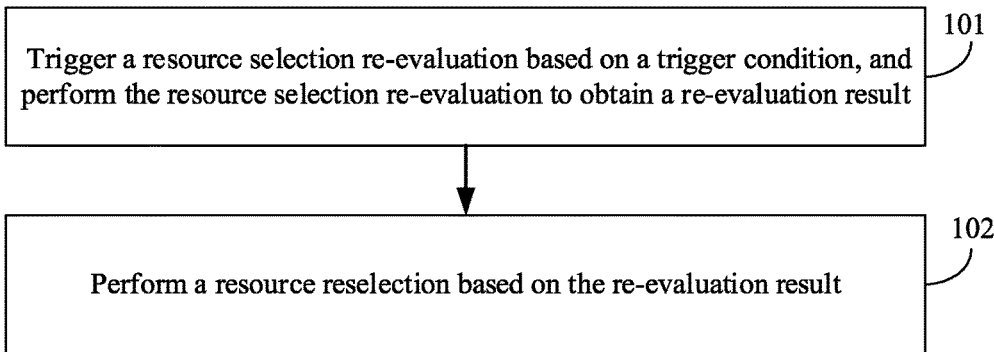
FIG. 1 is a flowchart of a resource selection method according to an embodiment of this disclosure.

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

For ease of understanding of this disclosure, the following content is described first.

A sidelink (SL) refers to a link for direct data transmission between a terminal such as user equipment (UE) and UE without a network. Sending UE may send control information (for example, sidelink control information (SCI)) over a physical sidelink control channel (PSCCH), and send data over a physical sidelink shared channel (PSSCH). Receiving UE may demodulate the control information after receiving the control information, and determine a transport block size, a modulation and coding scheme, an allocated resource, and the like based on the demodulated control information; and then, the receiving UE may receive data over a corresponding time-frequency resource based on this information, and demodulate the data.

For a resource allocation mode of mode 2, UE may demodulate SCI and perform measurement of reference signal received power (RSRP) in each transmission time interval (TTI) to obtain information such as resource reservation and an RSRP measurement value, and perform resource exclusion and reservation on resources in a resource selection window based on information such as resource reservation and an RSRP measurement value obtained in a sensing window. The resource exclusion and reservation procedure may be as follows.

Step 1. Candidate resources in the resource selection window are identified. Optionally, 1. slot resources for this terminal (UE) to send data are excluded; 2. slot resources that are reserved by other UE and that have an associated SL-RSRP measurement value greater than an SL-RSRP threshold value in the resource selection window are excluded based on the information such as the resource reservation and the RSRP measurement value obtained in the sensing window; and 3. if the candidate resources identified in the resource selection window are fewer than a default percentage such as X % of a total number of resources in the resource selection window, the SL-RSRP threshold value is increased by default values, for example, 3 dB, allowing more resources to become candidate resources.

Step 2. Resources are randomly selected from the candidate resources identified in the resource selection window, and resource reservation is performed. In this step, retransmission resources can be reserved, and semi-persistent scheduling (SPS) resources can also be reserved.

In addition, in the resource allocation mode of mode 2, a resource pre-emption mechanism is supported. When a resource reserved by UE coincides with (or partially coincides with) a resource reserved by other UE with a higher-priority traffic and an SL-RSRP measurement value of these UEs on the associated resource is greater than a specific associated SL-RSRP threshold value, the UE with a lower-priority traffic triggers a resource reselection. The associated SL-RSRP threshold value herein may be a fixed RSRP threshold that is predefined or pre-configured by a base station. The fixed RSRP threshold may be determined based on a mapping relationship between the RSRP threshold value and information such as a priority, a packet delay budget (PDB), a traffic type, quality of traffic (QoS), and reliability that are of a to-be-transmitted traffic (that is, a current transport block (TB)) of the UE.

An applicable scenario of the embodiments of this disclosure is optionally a sidelink scenario, for example, including but not limited to an NR sidelink scenario.

For ease of understanding and avoidance of repeated descriptions, symbols involved in the following description and the accompanying drawings are described first as follows:

m: a sending time of resource reservation signaling;

n: a trigger time of a resource selection or reselection;

T1: a self-processing time length required by the terminal for a resource selection;

T3: a time length for the terminal to perform resource selection processing;

n+T1: a start point of the resource selection window; and n+T2: an end point of the resource selection window.

The following details the embodiments of this disclosure with reference to the accompanying drawings.

FIG. 1 is a flowchart of a resource selection method according to an embodiment of this disclosure. The method is applied to a terminal, and as shown in FIG. 1, the method includes the following steps.

Step 101: Trigger a resource selection re-evaluation based on a trigger condition, and perform the resource selection re-evaluation to obtain a re-evaluation result.

In this embodiment, the trigger condition may include any one of the following: a persistent or semi-persistent trigger condition, and an aperiodic trigger condition. The foregoing resource selection re-evaluation procedure may be performed by using the step 1 and step 2 described above, and the corresponding re-evaluation result may include: a default percentage (X %) of candidate resources selected by the terminal in the resource selection window. The default percentage may be predefined (for example, predefined in a protocol), or pre-configured by a network device (for example, a base station).

In an implementation, the resource selection re-evaluation may be triggered before time 'm−T3'.

Step 102: Perform a resource reselection based on the re-evaluation result.

In this embodiment, after the re-evaluation result is obtained, the terminal may reselect resources from the default percentage of candidate resources obtained through the re-evaluation, based on the re-evaluation result in a case that a given condition is satisfied.

In the resource selection method of the embodiments of this disclosure, the terminal can trigger a resource selection re-evaluation based on a trigger condition, perform the resource selection re-evaluation to obtain a re-evaluation result, and perform a resource reselection based on the re-evaluation result. Therefore, with the re-evaluation and resource reselection procedure, after autonomously selecting a resource, the terminal can re-evaluate resources in the resource selection window and reserve usable resources so as to select a more appropriate transmission resource, avoiding a resource collision.

In the embodiments of this disclosure, the foregoing persistent or semi-persistent trigger condition may include but is not limited to at least one of the following:

1. A trigger periodicity, where the trigger periodicity is a first time value.

Optionally, the first time value in 1 may be denoted by a Tf value. The terminal may use the Tf value as a periodicity to trigger resource selection re-evaluations in a persistent or semi-persistent manner.

In an implementation, the UE may trigger a semi-persistent resource selection re-evaluation after triggering a resource selection (for example, after time n or time n+T1).

In another implementation, the UE may trigger a semi-persistent resource selection re-evaluation in a case that a resource has been reserved.

Figure 2:
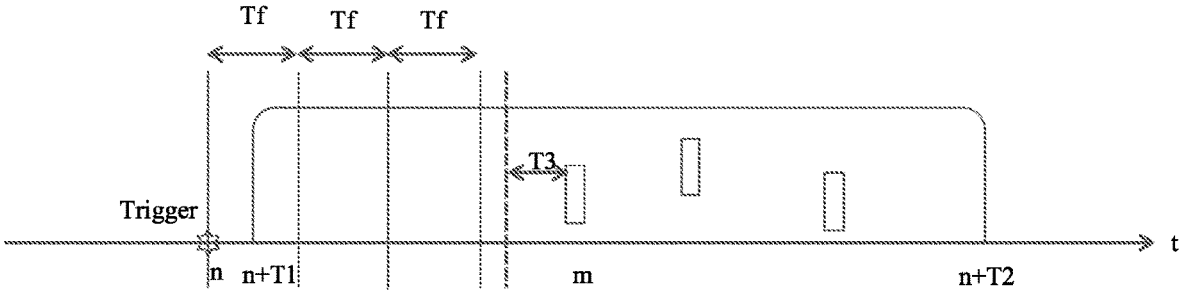
FIG. 2 is a first schematic diagram of triggering a re-evaluation according to an embodiment of this disclosure.

For example, as shown in FIG. 2, after triggering a resource selection or in the case that a resource has been reserved, the UE may use the Tf value as a periodicity to periodically trigger resource selection re-evaluations.

Optionally, the Tf value may be configured per resource pool, or the Tf value may be configured per UE.

Optionally, the Tf value may be any one of the following:

(1) predefined, for example, predefined in a protocol;

(2) configured by a network device (for example, a base station) or a control node (for example, control UE and a road side unit (RSU)); and (3) determined based on a mapping relationship with at least one of the following: at least one of a priority, a PDB, a traffic type, QoS, and reliability that are of a current to-be-transmitted traffic (that is, a current TB), an SL-RSRP threshold value, a channel busy ratio (CBR), a channel occupancy ratio (CR), hybrid automatic repeat request (HARQ) feedback information, and the like.

For example, the Tf value in the presence of a HARQ feedback configured may be different from the Tf value in the absence of a HARQ feedback configured, that is, the periodicities are different.

For another example, UEs with different UE processing capabilities may have different Tf values, that is, different periodicities.

For another example, UEs with different priorities may have different Tf values, that is, different periodicities. For example, a higher priority means a smaller Tf value and a shorter periodicity.

2. A Time Interval Between Two Successive Resource Selection Re-Evaluations being Less Than or Equal to a Second Time Value Optionally, the second time value may be the same as or different from the first time value.

In an implementation, the UE may trigger a semi-persistent resource selection re-evaluation after triggering a resource selection (for example, after time n or time n+T1). Herein, n is a trigger time of a resource selection or reselection, n+T1 is a start point of the resource selection window, and T1 is a self processing time length required by the UE for a resource selection.

In another implementation, the UE may trigger a semi-persistent resource selection re-evaluation in a case that a resource has been reserved.

It can be understood that in 2, the second time value is equivalent to an upper limit of a re-evaluation periodicity. The second time value may be any one of the following:

(1) predefined, for example, predefined in a protocol;

(2) configured by a network device (for example, a base station) or a control node (for example, control UE or an RSU); and (3) determined based on a mapping relationship with at least one of the following: at least one of a priority, a PDB, a traffic type, QoS, and reliability that are of a current to-be-transmitted traffic (that is, a current TB), an SL-RSRP threshold value, a CBR, a CR, HARQ feedback information, and the like.

3. A Default Number of Triggers

Optionally, the default number of triggers (for example, N, where N is an integer greater than 0) in 3 may be a largest number of resource selection re-evaluations that can be triggered.

In an implementation, in a case that the persistent or semi-persistent trigger condition includes the default number of triggers, the step 101 of triggering a resource selection re-evaluation based on a trigger condition may include: after the terminal triggers a resource selection or in a case that the terminal has a reserved resource, triggering resource selection re-evaluations of a quantity equal to the default number of triggers.

Optionally, the default number of triggers may be any one of the following:

(1) predefined, for example, predefined in a protocol;

(2) configured by a network device (for example, a base station) or a control node (for example, control UE or an RSU); and (3) determined based on a mapping relationship with at least one of the following: at least one of a priority, a PDB, a traffic type, QoS, and reliability that are of a current to-be-transmitted traffic (that is, a current TB), an SL-RSRP threshold value, a CBR, a CR, HARQ feedback information, and the like.

In the embodiments of this disclosure, the foregoing aperiodic trigger condition may include at least one of the following:

1. Triggering a resource selection re-evaluation at a first time before a sending time of resource reservation signaling. Herein, the first time is a first time length (T4) apart from the sending time (m). T4 is greater than or equal to T3. T4 may be predefined (for example, predefined in a protocol), or pre-configured by a network device (for example, a base station).

Optionally, a time unit of the first time may be any one of the following: slot, subframe, millisecond, mini-slot, frame, and the like. A time unit of T4 may be any one of the following: slot, subframe, ms, mini-slot, frame, and the like.

Figure 3:
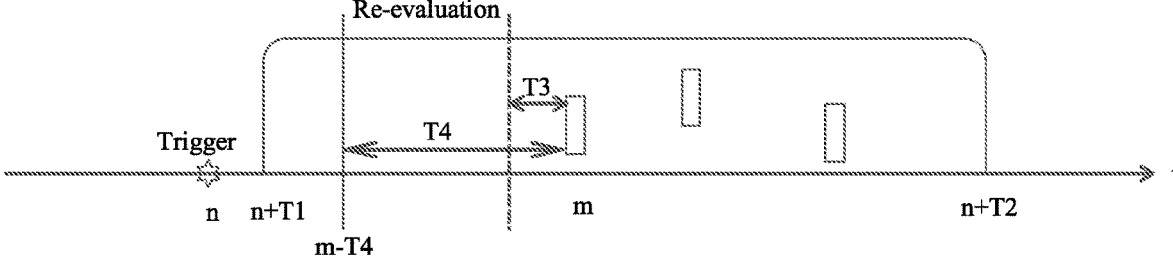
FIG. 3 is a second schematic diagram of triggering a re-evaluation according to an embodiment of this disclosure.

For example, as shown in FIG. 3, a resource selection re-evaluation is triggered at time (m−T4) before time m, 2. Triggering a resource selection re-evaluation at a second time before a starting time of each of the reserved resources, where the second time is a second time length (T5) apart from the starting time.

Optionally, T5 is greater than or equal to T3.

3. Triggering a resource selection re-evaluation at a third time before a transmission or retransmission time of each TB, where the third time is a third time length (T6) apart from the transmission or retransmission time.

4. Triggering a resource selection re-evaluation at a fourth time after an ending time of a last evaluation or re-evaluation, that is, triggering a next re-evaluation. The fourth time is a fourth time length (T7) apart from the ending time.

5. Triggering a resource selection re-evaluation at a fifth time after a trigger time or a re-evaluation time of the resource selection, where the fifth time is a fifth time length (T8) apart from the trigger time or the re-evaluation time.

Figure 4:
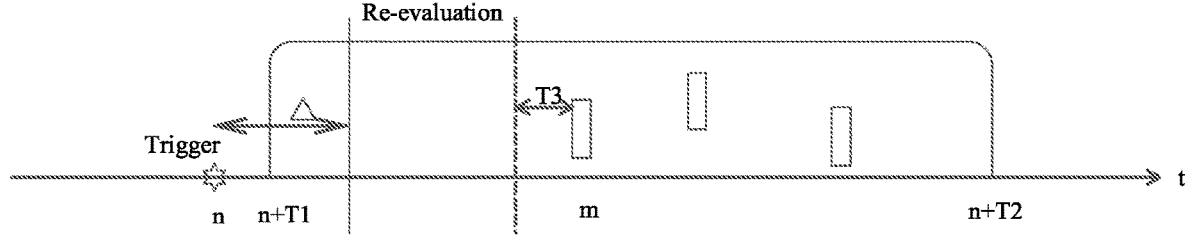
FIG. 4 is a third schematic diagram of triggering a re-evaluation according to an embodiment of this disclosure.

For example, as shown in FIG. 4, a resource selection re-evaluation is triggered after a trigger time (n) or a re-evaluation time (n+$\Delta$, n+T1, or n+T1+$\Delta$) of the resource selection.

6. Triggering a resource selection re-evaluation at a sixth time after a time when pre-emption of a reserved resource is detected. The sixth time is a sixth time length (T9) apart from the time when pre-emption of the reserved resource is detected.

7. Triggering a resource selection re-evaluation at a seventh time after negative-acknowledgment (NACK) information is received and no usable resource is left, where the seventh time is a seventh time length (T10) apart from a reception time of the NACK information.

Figure 5:
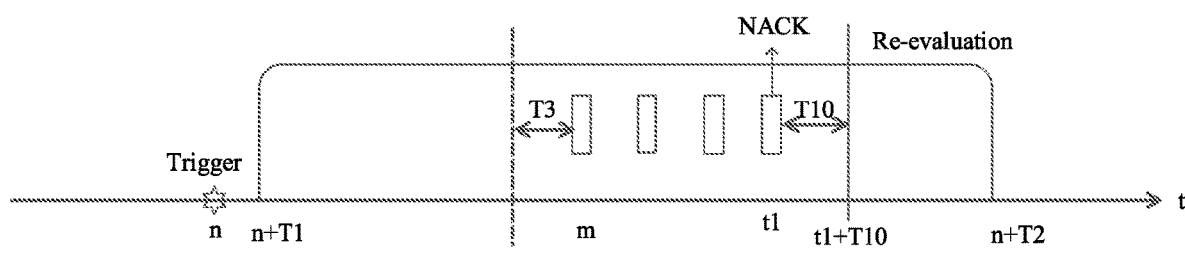
FIG. 5 is a fourth schematic diagram of triggering a re-evaluation according to an embodiment of this disclosure.

For example, as shown in FIG. 5, a resource selection re-evaluation is triggered at time (t1+T10) after NACK information is received and no usable resource is left (time 11).

8. Triggering a resource selection re-evaluation at an eighth time after a traffic arrives but no semi-persistently reserved resource is usable in a PDB or a resource selection window. The eighth time is an eighth time length (T11) apart from an arrival time of the traffic.

Figure 6:
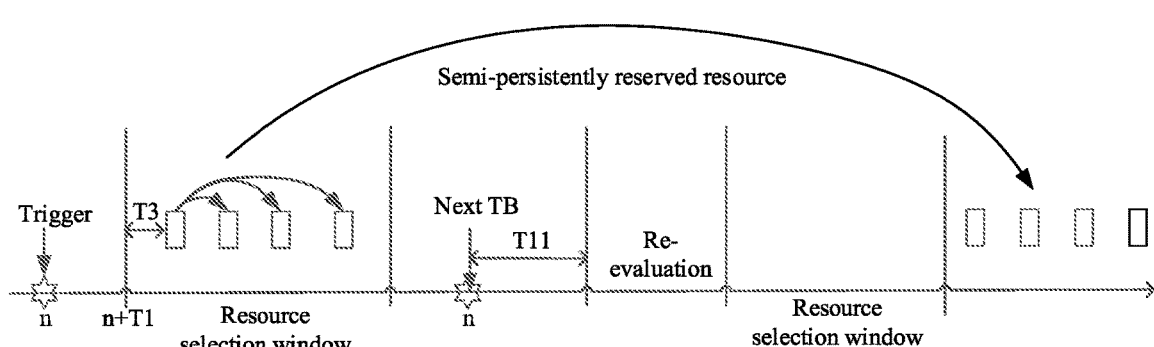
FIG. 6 is a fifth schematic diagram of triggering a re-evaluation according to an embodiment of this disclosure.

For example, as shown in FIG. 6, a resource selection re-evaluation is triggered a time length T11 after a traffic arrives but no semi-persistently reserved resource is usable in a PDB (or a selection window).

9. Triggering a resource selection re-evaluation at a ninth time after a transmission time of a TB. A number of retransmissions of the TBs exceeds a maximum number of retransmissions. The ninth time is a ninth time length (T12) apart from the transmission time.

10. Triggering a resource selection re-evaluation at a tenth time after radio link control (RLC) triggered retransmission information is received, where the tenth time is a tenth time length (T13) apart from a reception time of the RLC triggered retransmission information.

11. Triggering a resource selection re-evaluation at an eleventh time after a reserved resource is determined based on any one of the following to be no longer usable: a current SL transmission being dropped because of a transmission collision with a Uu interface, a collision between a current SL transmission and an SL transmission of another radio access technology (RAT), and a collision between a current carrier transmission and another carrier transmission during multiple carrier transmissions.

Herein, the eleventh time is an eleventh time length (T14) apart from a time when the reserved resource is determined to be no longer usable. For example, the current SL transmission is an NR SL transmission, and the SL transmission of another RAT is an LTE SL transmission.

12. Triggering based on a measurement feedback of the terminal.

Herein, the measurement feedback in 12 is, for example, channel state information (CSI), RSRP, or the like.

13. Triggering when acknowledgment (ACK) information is received and a resource has been reserved.

14. Triggering after a default number of pieces of NACK information are successively received.

Herein, the default number may be predefined (for example, predefined in a protocol), or pre-configured by a network device (for example, a base station).

It should be noted that any one of T5, T6, T7, T8, T9, T10, T11, T12, T13, T14, and A may be predefined (for example, predefined in a protocol), or pre-configured by a network device (for example, a base station).

Any one of T5, T6, T7, T8, T9, T10, T11, T12, T13, T14, and A is greater than or equal to 0, measured in a time unit which may be any one of the following: slot, subframe, ms, mini-slot, frame, and the like.

A time unit of any one of the second time, the third time, the fourth time, the fifth time, the sixth time, the seventh time, the eighth time, the ninth time, the tenth time, and the eleventh time may be any one of the following: slot, subframe, ms, mini-slot, frame, and the like.

In this way, with the setting of the trigger condition, the terminal can be prevented from frequently performing resource selection re-evaluations, thereby reducing processing complexity of the terminal, and guaranteeing the balance between processing complexity and system functionality of the terminal.

In the embodiments of this disclosure, the process of performing a resource selection re-evaluation to obtain a re-evaluation result in step 101 may include: determining a default percentage (X %) of candidate resources in a resource selection window when the resource selection re-evaluation is being performed. That is, the re-evaluation result in step 101 may include: a default percentage (X %) of candidate resources selected by the terminal in the resource selection window.

Optionally, an SL-RSRP threshold value for determining the default percentage (X %) of candidate resources may be determined based on any one of the following:

1. a priority of a current TB; and 2. a default TB priority.

For example, for the default setting, an SL-RSRP threshold value corresponding to each priority may be obtained based on a priority of each TB.

It should be noted that in 1 and 2, a method in the related art may be used when a corresponding SL-RSRP threshold value is determined based on a priority of a TB. This is not limited in this embodiment. The terminal may report to a higher layer after obtaining the candidate resources.

Optionally, when the re-evaluation result in step 101 includes a default percentage (X %) of candidate resources selected by the terminal in the resource selection window, step 102 may include: performing a resource reselection in a case that at least one of the following is satisfied:

1. The default percentage of candidate resources include none of previously reserved resources or include part of the previously reserved resources.

In an implementation, in 1, the terminal may perform a resource reselection based on resources left after a last evaluation.

It can be understood that when a resource evaluation is performed again in the resource selection window, selected candidate resources may be different from the candidate resources selected last time.

2. The terminal detects a collision between resources reserved by another terminal and the default percentage of candidate resources.

3. A default proportion (Y %) or more of resources are different between the default percentage (X %) of candidate resources and a default percentage (X %) of candidate resources obtained in a last evaluation.

Herein, when the terminal performs several evaluations or re-evaluations, X % of candidate resources obtained in each evaluation or re-evaluation does not change. X % is, for example, 20%, 30%, or the like.

For example, in cases of 20% of candidate resources obtained by UE in a previous evaluation being slot 1, slot 2, slot 3, slot 4, and slot 5, 20% of candidate resources obtained by the UE in a current evaluation being slot 1, slot 2, slot 6, slot 7, and slot 8, and the default proportion Y % being 50%, 60% of resources (that is, slot 6, slot 7, and slot 8) are different between the 20% of candidate resources obtained in the previous evaluation and the 20% of candidate resources obtained in the current evaluation, and since 60% is greater than 50%, the UE performs a resource reselection.

In this way, with the setting of the conditions related to the resource reselection, the terminal can select a more appropriate resource to transmit information, guaranteeing transmission performance of the terminal.

In addition, the terminal in the embodiment of this disclosure may also perform a resource reselection in a case that a resource selection re-evaluation has been triggered. That is, once a resource selection re-evaluation has been triggered, the terminal performs a resource reselection no matter what the re-evaluation result is. In this case, the conditions for resource reselection may be the same as the conditions for resource selection re-evaluation.

In the embodiments of this disclosure, the terminal can perform a resource reselection in a case that it is determined based on the re-evaluation result that another terminal with a higher-priority traffic has pre-empted a resource reserved by the terminal. Herein, the associated SL-RSRP threshold value for determining pre-emption of a resource reserved by the terminal may be any one of the following:

1. A First Threshold Value

Optionally, the first threshold value in 1 may be determined based on at least one of the following:

(1) A First RSRP Threshold Value

The first RSRP threshold value is an SL-RSRP threshold value for the terminal to obtain a default percentage (X %) of candidate resources in a last resource selection evaluation or re-evaluation.

It should be noted that in a case that a result of the last resource selection evaluation or re-evaluation is outdated, the terminal may ignore this evaluation/re-evaluation.

(2) A Second RSRP Threshold Value

The second RSRP threshold value is any one of an average value, a largest value, or a smallest value of a plurality of SL-RSRP threshold values for the terminal to obtain a default percentage (X %) of candidate resources in a last default number of resource selection evaluations or re-evaluations.

Optionally, the default number may be predefined (for example, predefined in a protocol), or pre-configured by a network device (for example, a base station). For example, the default number is S, and S is an integer greater than 1.

Alternatively, the default number may be a default number of resource selection evaluations or re-evaluations in a time window.

(3) A Third RSRP Threshold Value

The third RSRP threshold value is an SL-RSRP threshold value for a resource pre-empting terminal with a higher-priority traffic to determine a default percentage (X %) of candidate resources.

In an implementation, the third RSRP threshold value may be carried in SCI of UE with a higher-priority traffic.

In another implementation, in a case that a plurality of UEs with a higher-priority traffic have pre-empted resources, a largest value (or a smallest value or an average value) may be selected from a plurality of SL-RSRP threshold values carried in SCI of the plurality of UEs with a higher-priority traffic to serve as a third RSRP threshold value; or UE with a highest priority is selected from the plurality of UEs with a higher-priority traffic and an SL-RSRP threshold value carried in SCI of the UE with a highest priority is used as a third RSRP threshold value.

It can be understood that, in 1, the terminal may determine the first threshold value directly based on any one of the first RSRP threshold value, the second RSRP threshold value, and the third RSRP threshold value, that is, any one of the first RSRP threshold value, the second RSRP threshold value, and the third RSRP threshold value is directly used as the first threshold value.

Alternatively, the terminal may determine the first threshold value based on at least two RSRP threshold values of the first RSRP threshold value, the second RSRP threshold value, and the third RSRP threshold value. In this case, the first threshold value may be one with a higher priority that is selected by the terminal from the at least two RSRP threshold values based on a default priority order.

Optionally, the default priority order may be predefined (for example, predefined in a protocol), or pre-configured by a network device (for example, a base station).

In an implementation, the default priority order may include: a priority of the first RSRP threshold value being higher than a priority of the second RSRP threshold value and a priority of the third RSRP threshold value. That is, among the first, second, and third RSRP threshold values, the first RSRP threshold value has a highest priority.

2. A Value Obtained Based on the First Threshold Value and a Default Offset

Optionally, in 2, the default offset may be predefined (for example, predefined in a protocol), or pre-configured by a network device (for example, a base station).

In an implementation, when an associated SL-RSRP threshold value is obtained based on the first threshold value and the default offset, a sum of the first threshold value and the default offset may serve as the associated SL-RSRP threshold value.

Figure 7A:
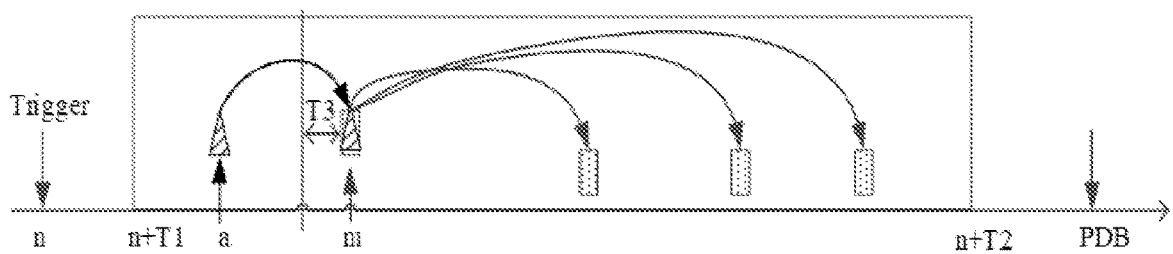
FIG. 7A is a first schematic diagram of resource pre-emption according to an embodiment of this disclosure.

In the embodiments of this disclosure, scenarios of resource pre-emption may include but are not limited to the following:

1. As shown in FIG. 7A, UE with a higher-priority traffic reserves (or pre-empts) an initial transmission resource reserved by a current UE for a current TB, that is, in FIG. 7A, a triangle takes the place of a blank rectangle. Resource reservation (pre-emption) signaling of the UE with a higher-priority traffic may be sent before time (m−T3), for example, at time a.

Figure 7B:
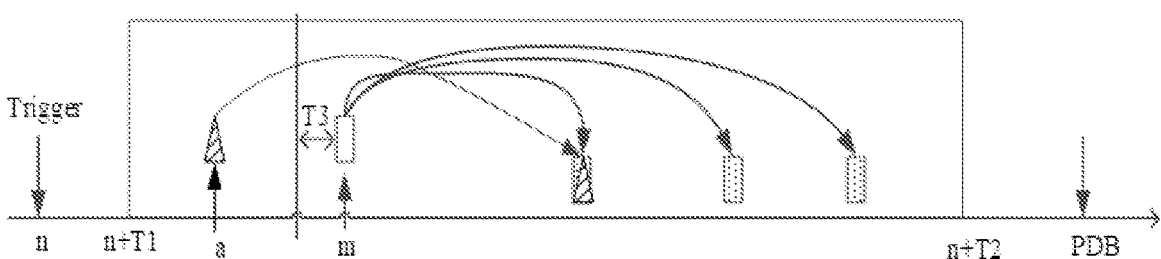
FIG. 7B is a second schematic diagram of resource pre-emption according to an embodiment of this disclosure.

2. As shown in FIG. 7B, UE with a higher-priority traffic reserves (or pre-empts) a retransmission resource reserved by a current UE for a current TB, that is, in FIG. 7B, a triangle takes the place of a rectangle that indicates the retransmission resource. Resource reservation (pre-emption) signaling of the UE with a higher-priority traffic may be sent before time (m−T3), for example, at time a.

Figure 7C:
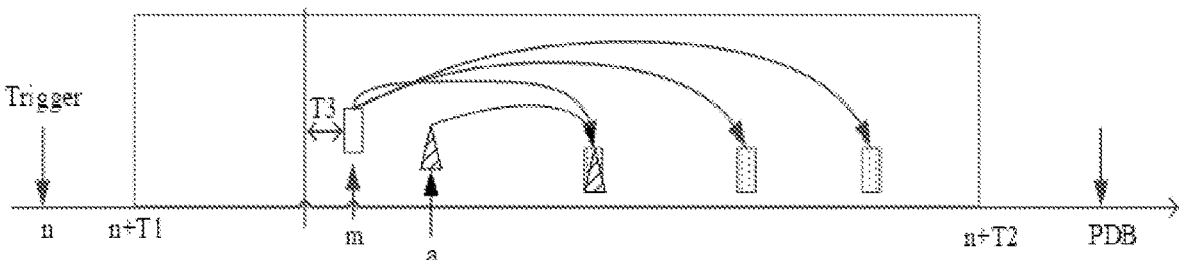
FIG. 7C is a third schematic diagram of resource pre-emption according to an embodiment of this disclosure.

3. As shown in FIG. 7C, UE with a higher-priority traffic reserves (or pre-empts) a retransmission resource reserved by a current UE for a current TB, that is, in FIG. 7C, a triangle takes the place of a rectangle that indicates the retransmission resource. Resource reservation (pre-emption) signaling of the UE with a higher-priority traffic may be sent after time m, for example, at time a.

Figure 7D:
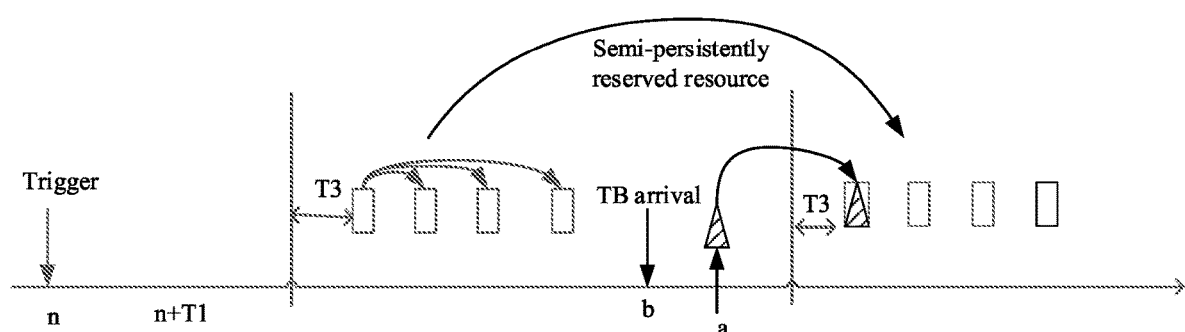
FIG. 7D is a fourth schematic diagram of resource pre-emption according to an embodiment of this disclosure.

4. As shown in FIG. 7D, UE with a higher-priority traffic reserves (or pre-empts) a resource reserved in a semi-persistent manner by a current UE. An arrival time (time b) of a latest traffic (TB) of this UE may be ahead of sending of resource reservation (pre-emption) signaling of the UE with a higher-priority traffic, and the resource reservation (pre-emption) signaling is sent at time a.

Figure 7E:
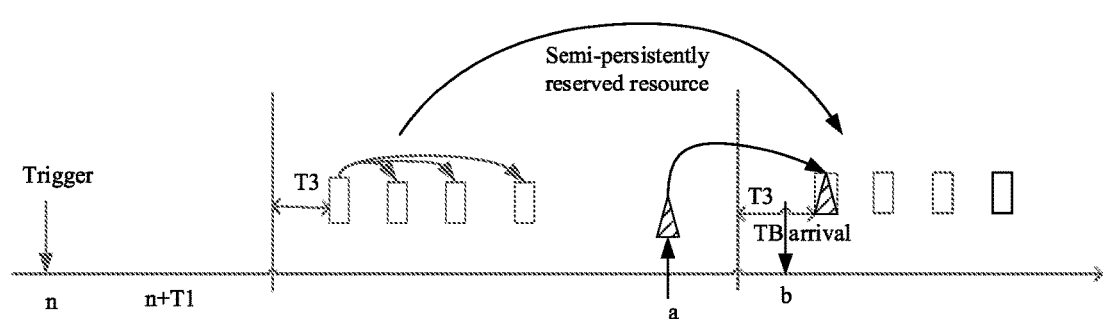
FIG. 7E is a fifth schematic diagram of resource pre-emption according to an embodiment of this disclosure.

5. As shown in FIG. 7E, UE with a higher-priority traffic reserves (or pre-empts) a resource reserved in a semi-persistent manner by a current UE. An arrival time (time b) of a latest traffic (TB) of this UE may be behind sending of resource reservation (pre-emption) signaling of the UE with a higher-priority traffic, and the resource reservation (pre-emption) signaling is sent at a time a.

Figure 7F:
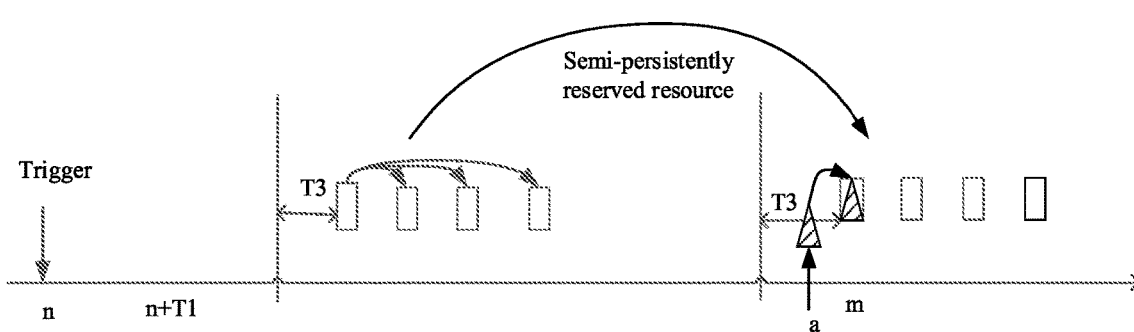
FIG. 7F is a sixth schematic diagram of resource pre-emption according to an embodiment of this disclosure.

6. As shown in FIG. 7F, UE with a higher-priority traffic reserves (or pre-empts) a resource reserved in a semi-persistent manner by a current UE. Resource reservation (pre-emption) signaling of the UE with a higher-priority traffic may be sent within a time period from m−T3 to m, for example, at time a.

The foregoing embodiments have described the resource selection method of this disclosure, and the following describes the terminal of this disclosure with reference to embodiments and the accompanying drawings.

Figure 8:
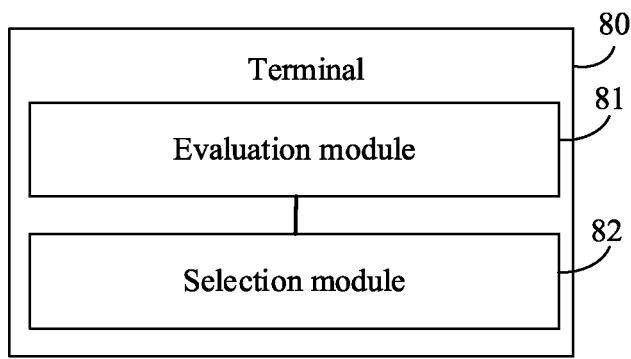
FIG. 8 is a first schematic structural diagram of a terminal according to an embodiment of this disclosure.

FIG. 8 is a schematic structural diagram of a terminal according to an embodiment of this disclosure. As shown in FIG. 8, the terminal 80 includes:

an evaluation module 81, configured to trigger a resource selection re-evaluation based on a trigger condition, and perform the resource selection re-evaluation to obtain a re-evaluation result; and a selection module 82, configured to perform a resource reselection based on the re-evaluation result.

Optionally, the trigger condition includes any one of the following:

a persistent or semi-persistent trigger condition; and an aperiodic trigger condition.

Optionally, the persistent or semi-persistent trigger condition includes at least one of the following:

a trigger periodicity, where the trigger periodicity is a first time value;

a time interval between two successive resource selection re-evaluations being less than or equal to a second time value; and a default number of triggers.

Optionally, in a case that the trigger condition includes the default number of triggers, the evaluation module 81 may be configured to: after the terminal triggers a resource selection or in a case that the terminal has a reserved resource, trigger resource selection re-evaluations of a quantity equal to the default number of triggers.

Optionally, any one of the first time value, the second time value, and the default number of triggers is any one of the following:

predefined;

configured by a network device or a control node; and determined based on a mapping relationship with at least one of the following: at least one of a priority, a PDB, a traffic type, QoS, and reliability that are of a current to-be-transmitted traffic, an SL-RSRP threshold value, a CBR, a CR, and HARQ feedback information.

Optionally, the aperiodic trigger condition includes at least one of the following:

triggering a resource selection re-evaluation at a first time before a sending time of resource reservation signaling, where the first time is a first time length apart from the sending time;

triggering a resource selection re-evaluation at a second time before a starting time of each of the reserved resources, where the second time is a second time length apart from the starting time;

triggering a resource selection re-evaluation at a third time before a transmission or retransmission time of each TB, where the third time is a third time length apart from the transmission or retransmission time;

triggering a resource selection re-evaluation at a fourth time after an ending time of a last evaluation or re-evaluation, where the fourth time is a fourth time length apart from the ending time;

triggering a resource selection re-evaluation at a fifth time after a trigger time or a re-evaluation time of the resource selection, where the fifth time is a fifth time length apart from the trigger time or the re-evaluation time;

triggering a resource selection re-evaluation at a sixth time after a time when pre-emption of a reserved resource is detected, where the sixth time is a sixth time length apart from the time when pre-emption of the reserved resource is detected;

triggering a resource selection re-evaluation at a seventh time after NACK information is received and no usable resource is left, where the seventh time is a seventh time length apart from a reception time of the NACK information and the usable resource is a resource meeting a QoS requirement;

triggering a resource selection re-evaluation at an eighth time after a traffic arrives but no semi-persistently reserved resource is usable in a PDB or a resource selection window, where the eighth time is an eighth time length apart from an arrival time of the traffic;

triggering a resource selection re-evaluation at a ninth time after a transmission time of a TB, where a number of retransmissions of the TBs exceeds a maximum number of retransmissions and the ninth time is a ninth time length apart from the transmission time;

triggering a resource selection re-evaluation at a tenth time after RLC triggered retransmission information is received, where the tenth time is a tenth time length apart from a reception time of the RLC triggered retransmission information;

triggering a resource selection re-evaluation at an eleventh time after a reserved resource is determined based on any one of the following to be no longer usable: a current SL transmission being dropped because of a transmission collision with a Uu interface, a collision between a current SL transmission and an SL transmission of another RAT, and a collision between a current carrier transmission and another carrier transmission, where the eleventh time is an eleventh time length apart from the time when the reserved resource is determined to be no longer usable;

triggering based on a measurement feedback of the terminal;

triggering when ACK information is received and a resource has been reserved; and triggering after a default number of pieces of NACK information are successively received.

Optionally, a time unit of the first time and the first time length is any one of the following:

slot, subframe, ms, mini-slot, and frame.

Optionally, the evaluation module 81 may be configured to determine a default percentage of candidate resources in a resource selection window when the resource selection re-evaluation is being performed.

Optionally, an SL-RSRP threshold value for determining the default percentage of candidate resources is determined based on any one of the following:

a priority of a current TB; and a default TB priority.

Optionally, the selection module 82 may be configured to:

perform the resource reselection in a case that at least one of the following is satisfied:

the default percentage of candidate resources include none of previously reserved resources or include part of the previously reserved resources;

the terminal detects a collision between resources reserved by another terminal and the default percentage of candidate resources; and a default proportion or more of resources are different between the default percentage of candidate resources and a default percentage of candidate resources obtained in a last evaluation.

Optionally, the selection module 82 is further configured to perform a resource reselection in a case that the terminal has triggered a resource selection re-evaluation.

Optionally, the selection module 82 is further configured to perform the resource reselection in a case that it is determined based on the re-evaluation result that another terminal with a higher-priority traffic has pre-empted a resource reserved by the terminal, where an associated SL-RSRP threshold value for determining pre-emption of a resource reserved by the terminal is any one of the following: a first threshold value, and a value obtained based on the first threshold value and a default offset; and the first threshold value is determined based on at least one of the following:

a first RSRP threshold value, where the first RSRP threshold value is an SL-RSRP threshold value for the terminal to obtain a default percentage of candidate resources in a last resource selection evaluation or re-evaluation;

a second RSRP threshold value, where the second RSRP threshold value is any one of an average value, a largest value, or a smallest value of a plurality of SL-RSRP threshold values for the terminal to obtain a default percentage of candidate resources in a last default number of resource selection evaluations or re-evaluations; and a third RSRP threshold value, where the third RSRP threshold value is an SL-RSRP threshold value for a resource pre-empting terminal with a higher-priority traffic to determine a default percentage of candidate resources.

Optionally, when the first threshold value is determined based on at least two RSRP threshold values of the first RSRP threshold value, the second RSRP threshold value, and the third RSRP threshold value, the first threshold value is one with a higher priority that is selected by the terminal from the at least two RSRP threshold values based on a default priority order.

Optionally, the default priority order includes: a priority of the first RSRP threshold value being higher than a priority of the second RSRP threshold value and a priority of the third RSRP threshold value.

The terminal 80 in this embodiment of this disclosure can implement the processes of the method embodiment in FIG. 1, with the same beneficial effects achieved. To avoid repetition, details are not described herein again.

An embodiment of this disclosure further provides a terminal, including a processor, a memory, and a computer program stored in the memory and capable of running on the processor. When the computer program is executed by the processor, processes of the foregoing embodiments of the resource selection method applied to a terminal are implemented, with the same technical effect achieved. To avoid repetition, details are not described herein again.

Figure 9:
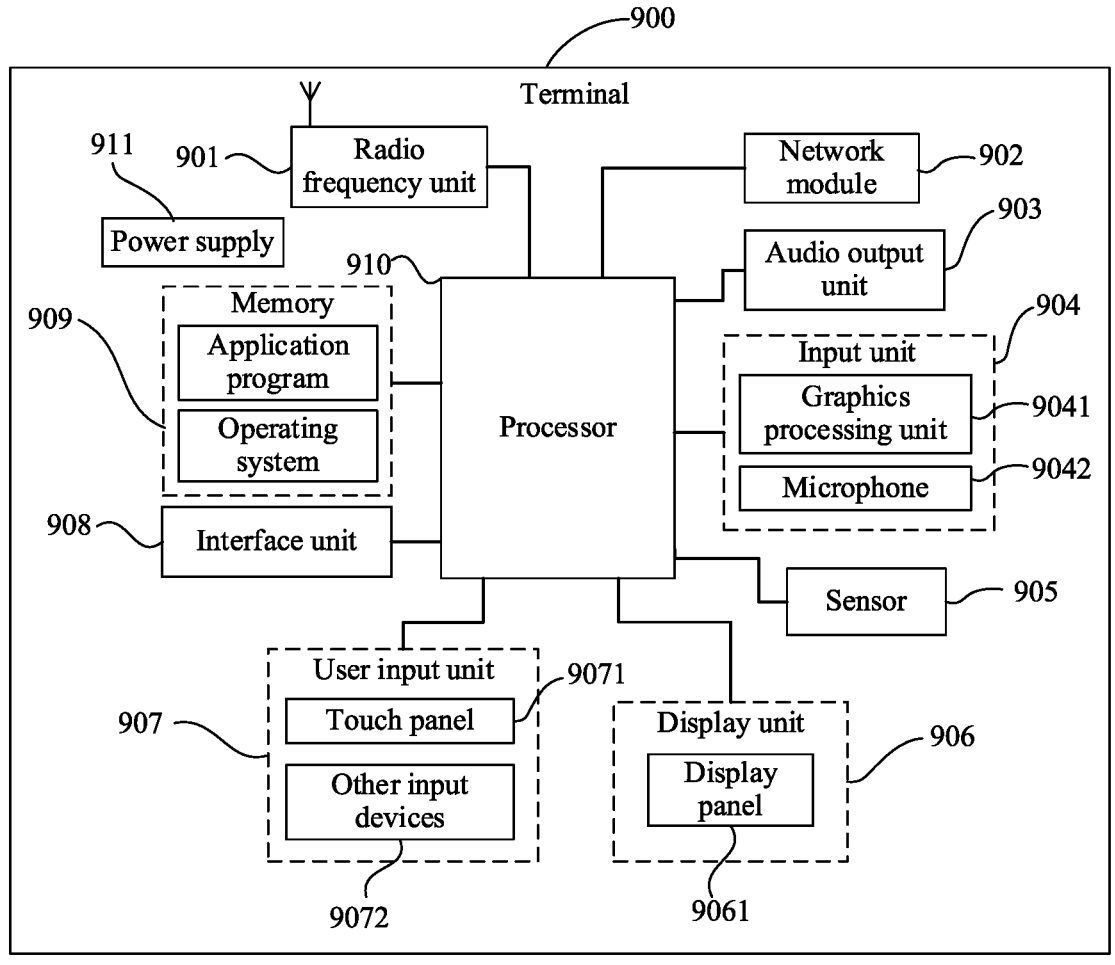
FIG. 9 is a second schematic structural diagram of a terminal according to an embodiment of this disclosure.

Optionally, FIG. 9 is a schematic diagram of a hardware structure of a terminal for implementing the embodiments of this disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art can understand that the terminal structure shown in FIG. 9 does not constitute any limitation on the terminal, the terminal may include more or fewer components than those shown in the figure, or combinations of some components, or different component layouts. In this embodiment of this disclosure, the terminal includes but is not limited to a mobile phone, a tablet computer, a notebook computer, a palmtop computer, an in-vehicle terminal, a wearable device, a pedometer, and the like.

The processor 910 is configured to trigger a resource selection re-evaluation based on a trigger condition, perform the resource selection re-evaluation to obtain a re-evaluation result, and perform a resource reselection based on the re-evaluation result.

The terminal 900 in this embodiment of this disclosure can implement the processes of the method embodiment in FIG. 1, with the same beneficial effects achieved. To avoid repetition, details are not described herein again.

It should be understood that, in this embodiment of this disclosure, the radio frequency unit 901 may be configured to receive or transmit a signal in an information reception or transmission or call process. Specifically, after receiving downlink data from a base station, the radio frequency unit 901 transmits the downlink data to the processor 910 for processing, and also transmits uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices through a wireless communications system.

The terminal provides a user with wireless broadband Internet access by using the network module 902, for example, helping the user receive and send e-mails, browsing web pages, and accessing streaming media.

The audio output unit 903 may convert audio data received by the radio frequency unit 901 or the network module 902 or stored in the memory 909 into an audio signal and output the audio signal as a sound. In addition, the audio output unit 903 may also provide an audio output (for example, a call signal reception sound or a message reception sound) related to a specific function performed by the terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a static picture or a video that is obtained by an image capture apparatus (for example, a camera) in a video capture mode or an image capture mode. A processed image frame may be displayed on the display unit 906. The image frame processed by the graphics processing unit 9041 may be stored in the memory 909 (or another storage medium) or transmitted by the radio frequency unit 901 or the network module 902. The microphone 9042 can receive a sound and process the sound into audio data. The processed audio data may be converted in a telephone call mode into a format that can be transmitted to a mobile communication base station by the radio frequency unit 901, for outputting.

The terminal 900 further includes at least one sensor 905, for example, an optical sensor, a motion sensor, and another sensor. Specifically, the optical sensor may include an ambient light sensor and a proximity sensor. The ambient light sensor may adjust luminance of the display panel 9061 based on brightness of ambient light, and the proximity sensor may turn off the display panel 9061 and/or backlight when the terminal 900 moves close to an ear. As one type of motion sensor, an accelerometer sensor may detect magnitudes of accelerations in various directions (usually, three axes), may detect, in a still state, a magnitude and a direction of gravity, and may be configured to recognize a terminal posture (for example, screen switching between a landscape mode and a portrait mode, related games, and magnetometer posture calibration), implement a vibration recognition related function (for example, a pedometer or tapping), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by a user or information provided to the user. The display unit 906 may include the display panel 9061. The display panel 9061 may be configured in a form of a liquid crystal display (LCD), an organic light-emitting diode (OLED), or the like.

The user input unit 907 may be configured to receive the input digit or character information, and generate a key signal input related to user settings and function control of the terminal. Specifically, the user input unit 907 includes a touch panel 9071 and other input devices 9072. The touch panel 9071 is also referred to as a touchscreen, and may collect a touch operation of the user on or near the touch panel (for example, an operation performed on or near the touch panel 9071 by the user by using any appropriate object or accessory such as a finger or a stylus). The touch panel 9071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 910, receives a command transmitted by the processor 910, and executes the command. In addition, the touch panel 9071 may be implemented in a plurality of forms, for example, as a resistive, capacitive, infrared, or surface acoustic wave touch panel. In addition to the touch panel 9071, the user input unit 907 may further include the other input devices 9072. Specifically, the other input devices 9072 may include but are not limited to a physical keyboard, a function key (for example, a volume control key and an on/off key), a trackball, a mouse and a joystick. Details are not described herein.

Further, the touch panel 9071 may cover the display panel 9061. After detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. In FIG. 9, the touch panel 9071 and the display panel 9061 serve as two separate components to implement input and output functions of the terminal. However, in some embodiments, the touch panel 9071 and the display panel 9061 may be integrated to implement the input and output functions of the terminal. This is not specifically limited herein.

The interface unit 908 is an interface for connecting an external apparatus to the terminal 900. For example, the external apparatus may include a wired or wireless headphone port, an external power (or battery charger) port, a wired or wireless data port, a memory card port, a port for connecting an apparatus that has an identification module, an audio input/output (I/O) port, a video I/O port, an earphone port, and the like. The interface unit 908 may be configured to receive an input (for example, data information or power) from the external apparatus and transmit the received input to one or more elements in the terminal 900, or may be configured to transmit data between the terminal 900 and the external apparatus.

The memory 909 may be configured to store a software program and various data. The memory 909 may substantially include a program storage region and a data storage region. The program storage region may store an operating system, an application program required for at least one function (for example, a sound play function and an image play function), and the like. The data storage region may store data (for example, audio data and a phone book) created based on use of a mobile phone, and the like. In addition, the memory 909 may include a high-speed random access memory, and may further include a non-volatile memory such as a disk storage device, a flash memory device, or another volatile solid-state storage device.

The processor 910 is a control center of the terminal, and is connected to all components of the terminal by using various interfaces and lines. By running or executing software programs and/or modules that are stored in the memory 909 and calling data stored in the memory 909, the processor 910 executes various functions of the terminal and processes data, so as to perform overall monitoring on the terminal. The processor 910 may include one or more processing units. Optionally, the processor 910 may integrate an application processor and a modem processor. The application processor mainly processes an operating system, a user interface, an application program, and the like. The modem processor mainly processes wireless communication. It can be understood that the modem processor may alternatively be not integrated in the processor 910.

The terminal 900 may further include a power supply 911 (for example, a battery) that supplies power to the components. Optionally, the power supply 911 may be logically connected to the processor 910 through a power management system, so as to implement functions such as charging management, discharging management, and power consumption management through the power management system.

In addition, the terminal 900 may further include some functional modules that are not shown. Details are not described herein.

An embodiment of this disclosure further provides a computer-readable storage medium, where a computer program is stored in the computer readable storage medium. When the computer program is executed by a processor, the processes of the foregoing embodiment of the resource selection method applied to the terminal can be implemented, with the same technical effects achieved. To avoid repetition, details are not described herein again. The computer-readable storage medium may be a read-only memory (ROM), a random access memory (RAM), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. Without more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, persons of ordinary skill in the art can develop many other forms without departing from the principle of this disclosure and the protection scope of the claims, and all such forms fall within the protection scope of this disclosure.

What is claimed is:

1. A resource selection method, applied to a terminal and comprising:

triggering a resource selection re-evaluation based on a
        trigger condition for triggering the resource selection re-evaluation, and performing the resource selection re-evaluation to obtain a re-evaluation result; and performing a resource reselection based on the re-evaluation result;

wherein the trigger condition comprises an aperiodic trigger condition;

wherein the aperiodic trigger condition comprises at least one of the following:

triggering a resource selection re-evaluation at a first time before a sending time of resource reservation signaling, wherein the first time is a first time length apart from the sending time;

triggering a resource selection re-evaluation at a second time before a starting time of each of the reserved resources, wherein the second time is a second time length apart from the starting time;

triggering a resource selection re-evaluation at a third time before a transmission or retransmission time of each transport block (TB), wherein the third time is a third time length apart from the transmission or retransmission time;

triggering a resource selection re-evaluation at a fourth time after an ending time of a last evaluation or re-evaluation, wherein the fourth time is a fourth time length apart from the ending time;

triggering a resource selection re-evaluation at a fifth time after a trigger time or a re-evaluation time of the resource selection, wherein the fifth time is a fifth time length apart from the trigger time or the re-evaluation time;

triggering a resource selection re-evaluation at a sixth time after a time when pre-emption of a reserved resource is detected, wherein the sixth time is a sixth time length apart from the time when pre-emption of the reserved resource is detected;

triggering a resource selection re-evaluation at a seventh time after negative-acknowledgment (NACK) information is received and no usable resource is left, wherein the seventh time is a seventh time length apart from a reception time of the NACK information and the usable resource is a resource meeting a QoS requirement;

triggering a resource selection re-evaluation at an eighth time after a traffic arrives but no semi-persistently reserved resource is usable in a PDB or a resource selection window, wherein the eighth time is an eighth time length apart from an arrival time of the traffic;

triggering a resource selection re-evaluation at a ninth time after a transmission time of a TB, wherein a number of retransmissions of the TBs exceeds a maximum number of retransmissions and the ninth time is a ninth time length apart from the transmission time;

triggering a resource selection re-evaluation at a tenth time after radio link control (RLC) triggered retransmission information is received, wherein the tenth time is a tenth time length apart from a reception time of the RLC triggered retransmission information;

triggering a resource selection re-evaluation at an eleventh time after a reserved resource is determined based on any one of the following to be no longer usable: a current sidelink (SL) transmission being dropped because of a transmission collision with a Uu interface, a collision between a current SL transmission and an SL transmission of another radio access technology (RAT), and a collision between a current carrier transmission and another carrier transmission, wherein the eleventh time is an eleventh time length apart from a time when the reserved resource is determined to be no longer usable;

triggering based on a measurement feedback of the terminal;

triggering when acknowledgment (ACK) information is received and a resource has been reserved; and triggering after a default number of pieces of NACK information are successively received.

2. The method according to claim 1, wherein a time unit of the first time and the first time length is any one of the following:

slot, subframe, ms, mini-slot, and frame.

3. The method according to claim 1, wherein the performing the resource selection re-evaluation to obtain a re-evaluation result comprises:

determining a default percentage of candidate resources in a resource selection window when the resource selection re-evaluation is being performed.

4. The method according to claim 3, wherein an SL-RSRP threshold value for determining the default percentage of candidate resources is determined based on any one of the following:

a priority of a current TB; and a default TB priority.

5. The method according to claim 3, wherein the performing a resource reselection based on the re-evaluation result comprises:

performing the resource reselection in a case that at least one of the following is satisfied:

the default percentage of candidate resources comprise none of previously reserved resources or comprise part of the previously reserved resources;

the terminal detects a collision between resources reserved by another terminal and the default percentage of candidate resources; and a default proportion or more of resources are different between the default percentage of candidate resources and a default percentage of candidate resources obtained in a last evaluation.

6. The method according to claim 1, further comprising:

performing a resource reselection in a case that the terminal has triggered a resource selection re-evaluation.

7. The method according to claim 1, wherein the performing a resource reselection based on the re-evaluation result comprises:

performing the resource reselection in a case that it is determined based on the re-evaluation result that another terminal with a higher-priority traffic has pre-empted a resource reserved by the terminal, wherein an associated SL-RSRP threshold value for determining pre-emption of a resource reserved by the terminal is any one of the following: a first threshold value, and a value obtained based on the first threshold value and a default offset; and the first threshold value is determined based on at least one of the following:

a first RSRP threshold value, wherein the first RSRP threshold value is an SL-RSRP threshold value for the terminal to obtain a default percentage of candidate resources in a last resource selection evaluation or re-evaluation;

a second RSRP threshold value, wherein the second RSRP threshold value is any one of an average value, a largest value, or a smallest value of a plurality of SL-RSRP threshold values for the terminal to obtain a default percentage of candidate resources in a last default number of resource selection evaluations or re-evaluations; and a third RSRP threshold value, wherein the third RSRP threshold value is an SL-RSRP threshold value for a resource pre-empting terminal with a higher-priority traffic to determine a default percentage of candidate resources.

8. The method according to claim 7, wherein when the first threshold value is determined based on at least two RSRP threshold values of the first RSRP threshold value, the second RSRP threshold value, and the third RSRP threshold value, the first threshold value is one with a higher priority that is selected by the terminal from the at least two RSRP threshold values based on a default priority order.

9. The method according to claim 8, wherein the default priority order comprises: a priority of the first RSRP threshold value being higher than a priority of the second RSRP threshold value and a priority of the third RSRP threshold value.

10. A terminal, comprising a memory, a processor, and a computer program stored in the memory and capable of running on the processor, wherein when the computer program is executed by the processor, the following steps are implemented:

triggering a resource selection re-evaluation based on a trigger condition for triggering the resource selection re-evaluation, and performing the resource selection re-evaluation to obtain a re-evaluation result; and performing a resource reselection based on the re-evaluation result;

wherein the trigger condition comprises an aperiodic trigger condition;

wherein the aperiodic trigger condition comprises at least one of the following:

triggering a resource selection re-evaluation at a first time before a sending time of resource reservation signaling, wherein the first time is a first time length apart from the sending time;

triggering a resource selection re-evaluation at a second time before a starting time of each of the reserved resources, wherein the second time is a second time length apart from the starting time;

triggering a resource selection re-evaluation at a third time before a transmission or retransmission time of each transport block (TB), wherein the third time is a third time length apart from the transmission or retransmission time;

triggering a resource selection re-evaluation at a fourth time after an ending time of a last evaluation or re-evaluation, wherein the fourth time is a fourth time length apart from the ending time;

triggering a resource selection re-evaluation at a fifth time after a trigger time or a re-evaluation time of the resource selection, wherein the fifth time is a fifth time length apart from the trigger time or the re-evaluation time;

triggering a resource selection re-evaluation at a sixth time after a time when pre-emption of a reserved resource is detected, wherein the sixth time is a sixth time length apart from the time when pre-emption of the reserved resource is detected;

triggering a resource selection re-evaluation at a seventh time after negative-acknowledgment (NACK) information is received and no usable resource is left, wherein the seventh time is a seventh time length apart from a reception time of the NACK information and the usable resource is a resource meeting a QoS requirement;

triggering a resource selection re-evaluation at an eighth time after a traffic arrives but no semi-persistently reserved resource is usable in a PDB or a resource selection window, wherein the eighth time is an eighth time length apart from an arrival time of the traffic;

triggering a resource selection re-evaluation at a ninth time after a transmission time of a TB, wherein a number of retransmissions of the TBs exceeds a maximum number of retransmissions and the ninth time is a ninth time length apart from the transmission time;

triggering a resource selection re-evaluation at a tenth time after radio link control (RLC) triggered retransmission information is received, wherein the tenth time is a tenth time length apart from a reception time of the RLC triggered retransmission information;

triggering a resource selection re-evaluation at an eleventh time after a reserved resource is determined based on any one of the following to be no longer usable: a current sidelink (SL) transmission being dropped because of a transmission collision with a Uu interface, a collision between a current SL transmission and an SL transmission of another radio access technology (RAT), and a collision between a current carrier transmission and another carrier transmission, wherein the eleventh time is an eleventh time length apart from a time when the reserved resource is determined to be no longer usable;

triggering based on a measurement feedback of the terminal;

triggering when acknowledgment (ACK) information is received and a resource has been reserved; and triggering after a default number of pieces of NACK information are successively received.

11. The terminal according to claim 10, wherein when the computer program is executed by the processor, the following step is further implemented:

performing a resource reselection in a case that the terminal has triggered a resource selection re-evaluation.

12. A non-transitory computer-readable storage medium, storing a computer program, wherein when the computer program is executed by a processor, the following steps are implemented:

triggering a resource selection re-evaluation based on a trigger condition for triggering the resource selection re-evaluation, and performing the resource selection re-evaluation to obtain a re-evaluation result; and performing a resource reselection based on the re-evaluation result;

wherein the trigger condition comprises an aperiodic trigger condition;

wherein the aperiodic trigger condition comprises at least one of the following:

triggering a resource selection re-evaluation at a first time before a sending time of resource reservation signaling, wherein the first time is a first time length apart from the sending time;

triggering a resource selection re-evaluation at a second time before a starting time of each of the reserved resources, wherein the second time is a second time length apart from the starting time;

triggering a resource selection re-evaluation at a third time before a transmission or retransmission time of each transport block (TB), wherein the third time is a third time length apart from the transmission or retransmission time;

triggering a resource selection re-evaluation at a fourth time after an ending time of a last evaluation or re-evaluation, wherein the fourth time is a fourth time length apart from the ending time;

triggering a resource selection re-evaluation at a fifth time after a trigger time or a re-evaluation time of the resource selection, wherein the fifth time is a fifth time length apart from the trigger time or the re-evaluation time;

triggering a resource selection re-evaluation at a sixth time after a time when pre-emption of a reserved resource is detected, wherein the sixth time is a sixth time length apart from the time when pre-emption of the reserved resource is detected;

triggering a resource selection re-evaluation at a seventh time after negative-acknowledgment (NACK) information is received and no usable resource is left, wherein the seventh time is a seventh time length apart from a reception time of the NACK information and the usable resource is a resource meeting a QoS requirement;

triggering a resource selection re-evaluation at an eighth time after a traffic arrives but no semi-persistently reserved resource is usable in a PDB or a resource selection window, wherein the eighth time is an eighth time length apart from an arrival time of the traffic;

triggering a resource selection re-evaluation at a ninth time after a transmission time of a TB, wherein a number of retransmissions of the TBs exceeds a maximum number of retransmissions and the ninth time is a ninth time length apart from the transmission time;

triggering a resource selection re-evaluation at a tenth time after radio link control (RLC) triggered retransmission information is received, wherein the tenth time is a tenth time length apart from a reception time of the RLC triggered retransmission information;

triggering a resource selection re-evaluation at an eleventh time after a reserved resource is determined based on any one of the following to be no longer usable: a current sidelink (SL) transmission being dropped because of a transmission collision with a Uu interface, a collision between a current SL transmission and an SL transmission of another radio access technology (RAT), and a collision between a current carrier transmission and another carrier transmission, wherein the eleventh time is an eleventh time length apart from a time when the reserved resource is determined to be no longer usable;

triggering based on a measurement feedback of the terminal;

triggering when acknowledgment (ACK) information is received and a resource has been reserved; and triggering after a default number of pieces of NACK information are successively received.

* * * * *